United States Patent [19]

Kim et al.

[11] Patent Number: 5,499,125
[45] Date of Patent: Mar. 12, 1996

[54] LIQUID CRYSTAL DISPLAY WITH A SMOOTHING FILM IN A TREACHED SUBSTRATE AND METHOD FOR FORMING THE SAME

[75] Inventors: Hyeon-tae Kim; Jin-kyu Kang, both of Kyunggi-do, Rep. of Korea

[73] Assignee: Samsung Display Devices Co., Ltd., Kyunggi-do, Rep. of Korea

[21] Appl. No.: 339,549

[22] Filed: Nov. 15, 1994

[30] Foreign Application Priority Data

Jun. 2, 1994 [KR] Rep. of Korea .................. 94-12352

[51] Int. Cl.⁶ .................... G02F 1/1335; G02F 1/1333
[52] U.S. Cl. .................... 359/67; 359/74; 359/79
[58] Field of Search .................... 359/67, 79, 74

[56] References Cited

U.S. PATENT DOCUMENTS 4,576,851  3/1986  Iwamatsu .................... 428/156
4,718,751  1/1988  Kamijo et al. .................... 359/88

FOREIGN PATENT DOCUMENTS 2141517  6/1987  Japan .

*Primary Examiner*—Anita Pellman Gross
*Assistant Examiner*—Fetsum Abraham
*Attorney, Agent, or Firm*—Christie, Parker & Hale

[57] ABSTRACT

There is provided a liquid crystal display with high resolution and high quality by filling up the carbon black solution which is an economical material for stabilizing the process between the patterns for driving the liquid crystal smoothing the electrodes and alignment films in order to remove the height difference between the patterns of a group of transparent electrodes.

5 Claims, 3 Drawing Sheets

LIQUID CRYSTAL DISPLAY WITH A SMOOTHING FILM IN A TREACHED SUBSTRATE AND METHOD FOR FORMING THE SAME

BACKGROUND OF THE INVENTION

1. Field of the Invention

The present invention relates generally to a liquid crystal display with a smoothing film and method for forming the same.

2. Description of Prior Art

In an age of visual information, considerable interest is concentrated on a medium of information transfer, an image display. As a result of the interest, various flat-type displays replacing an existing cathode ray tube are developed and rapidly popularized.

The technical progress of a liquid crystal display having thin, light and low consumption power characteristics, and driven by low voltage is remarkable, and the liquid crystal display has been widely used in display monitors for vehicles or in the screen of color televisions as well as in display monitors for lap-top personal computers or pocket computers.

Using such characteristics material having the dielectric anisotropy is oriented on the electric field, and the picture is displayed in the above-mentioned liquid crystal display. FIG. 1 is a view illustrating a general structure of a liquid crystal display in prior art.

Referring to FIG. 1, the liquid crystal display includes a front plate 1a and a rear plate 1b stuck to each other by a sealing material applied on the edge of them to form a predetermined closed space where liquid crystal is injected, transparent electrodes 2a, 2b formed on inner surfaces of the front plate 1a and the rear plate 1b in a predetermined pattern, alignment films 4a, 4b disposed on upper portions of the transparent electrodes 2a, 2b and aligning a molecule of the liquid crystal injected into the closed space in a predetermined direction. Insulating layers 3a, 3b are formed between the transparent electrodes 2a, 2b and the alignment films 4a, 4b, and spacers 6 are formed in the closed space to keep and control a gap between the front and rear plate 1a, 1b.

The alignment films 4a, 4b formed in the upper portions of the transparent electrodes 2a, 2b are formed as follows. The alignment films 4a, 4b are laid inside the front plate 1a and the rear front 1b whereon the transparent electrodes 2a, 2b are formed in a predetermined pattern by spinning or offset printing. Thereafter, the alignment films 4a, 4b are treated with a predetermined heat and surfaces opposite each other are rubbed at a predetermined angle in order to align the molecule of the liquid crystal in the predetermined direction.

At this time, referring to FIG. 2, the insulating layer 3a or the alignment film 4a of the front plate 1a is not uniform due to a height difference between a portion with electrodes and a portion without electrodes. Because of a trend toward a display of high quality, the above-mentioned problem has been given serious consideration. As the display device is bigger and finer, indium tin oxide transparent electrodes for driving the liquid crystal need low resistance electrodes, 5 to 15 $\Omega/cm^2$. As the resistance of the indium thin oxide film is lower, the electrodes have a film with a thickness of more than 2000 Å. since the alignment characteristic of the alignment film dispersed on the electrodes is different according to the height difference, the bad quality of the liquid crystal display occurs. Moreover, as numbers of pixel are densified, the height and length difference of the indium tin oxide electrode 2a between pitches increases. As a result, the indium tin oxide electrode and the alignment film must be flat.

SUMMARY OF THE INVENTION

It is an object of the present invention to provide not only a liquid crystal display with high resolution and of high quality but also the method for forming the same by removing a height difference between patterns of a group of transparent electrodes for driving liquid crystal which is a lower layer of a front plate whereon a plurality of layers are deposited.

To achieve the above objective, there is provided the liquid crystal display with a smoothing film and method for forming the same.

According to a further aspect of the present invention, a method for forming the liquid crystal display includes the steps of:

forming a group of electrodes having a predetermined pattern inside a front plate;

forming a trench having a predetermined depth by etching the front plate by using the pattern of the electrodes as a mask;

filling up a smoothing film having about the same height as that of the patterns of the electrodes in the upper portion of the front plate trenched; and forming an insulating layer and an alignment film respectively on the upper portion of the smoothing film and the pattern of the electrodes.

Furthermore, in order to comply with the desire of consumers for high quality, this present invention uses carbon black solution as a smoothing film. The carbon black solution used as a material for stabilizing the process results in a simple process and a low basic cost.

It is to be understood that both the foregoing general description and the following detailed description are exemplary and explanatory and are intended to provide further explanation of the invention as claimed.

The accompanying drawings, which are incorporated in and constitute a part of this specification, illustrate one embodiment of the invention and together with the description, serve to explain the principles of the invention.

DETAILED DESCRIPTION OF THE PREFERRED EMBODIMENTS

Reference will now be made in detail to the preferred embodiment of the invention, an example of which is illustrated in the accompanying drawings.

Figure 1:
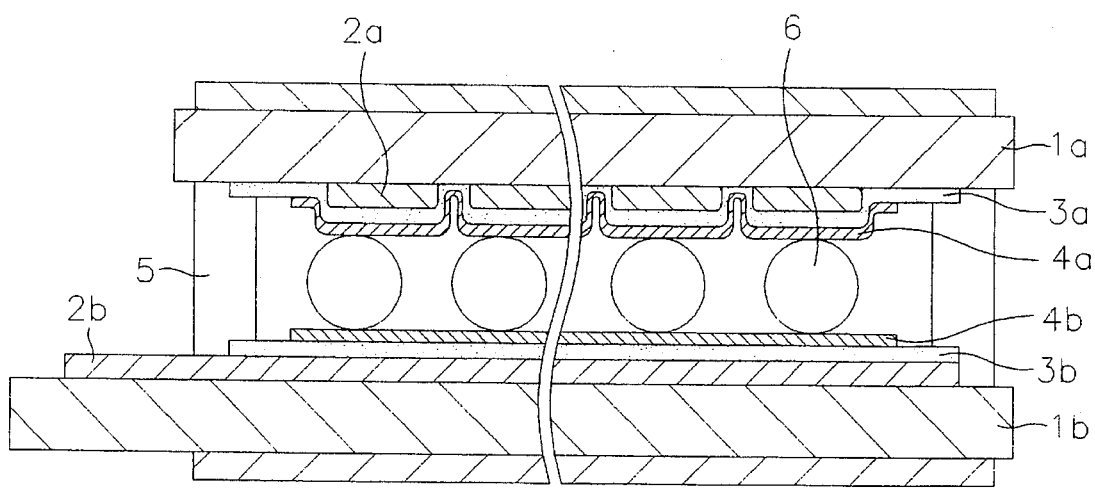
FIG. 1 is a sectional view of a prior art liquid crystal display.
Figure 2:
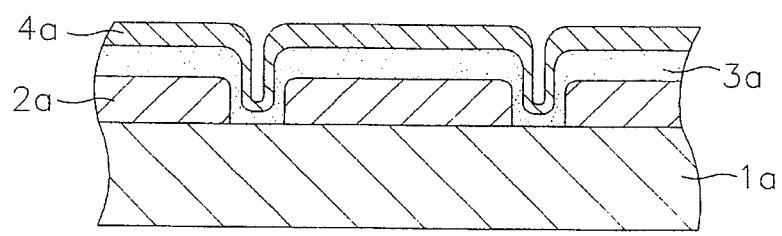
FIG. 2 is a partially enlarged sectional view of a front plate in FIG. 1.
Figure 3:
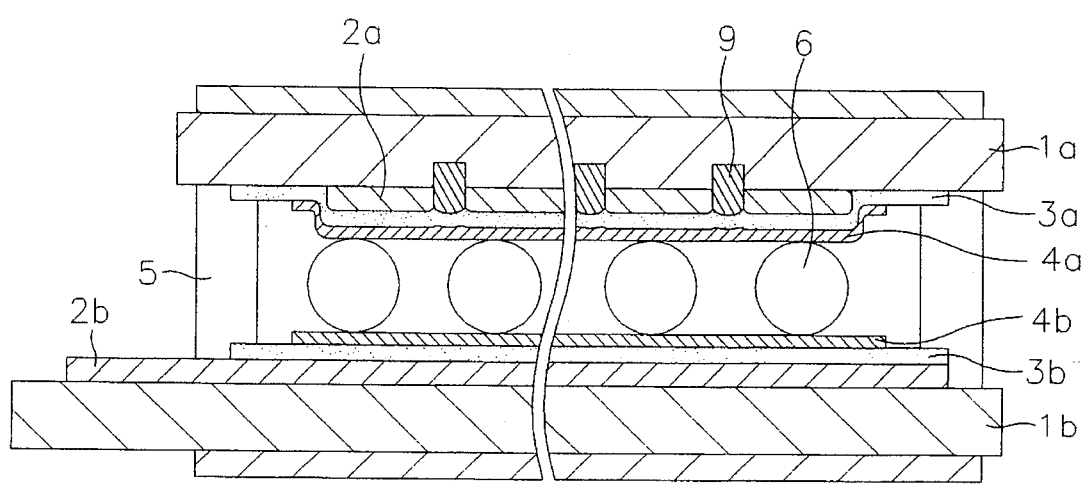
FIG. 3 is a sectional view of a liquid crystal display with a smoothing film according to a preferred embodiment of the present invention.

Referring to FIG. 3, there is no significant difference between the structure of a rear plate 1b of a liquid crystal display according to a preferred embodiment of the present invention and that of FIG. 1. However, the structure of a front plate 1a is not the same as FIG. 1. Referring to FIG. 3, smoothing films 9 are formed between the patterns of a group of transparent electrodes 2a for driving liquid crystal, which is the lowest layer of the front plate 1a and the layers deposited on an upper portion of the electrodes 2a are smoothed, so that a height difference can be removed.

From now on, the same explanation and description will be omitted. Furthermore, like reference numerals designate like parts throughout all the specification and will be omitted.

With reference to FIG. 3 and FIGS. 4A to FIG. 4D according to the present invention, the method for forming a smoothing film for the liquid crystal display is as follows.

Figure 4A:
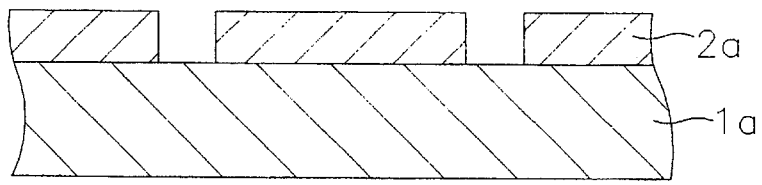
FIGS. 4A to 4D are flow charts of the successive steps in an operation illustrating a smoothing film for the liquid crystal display according to the preferred embodiment of the present invention.

A first step is forming a group of electrodes 2a with predetermined patterns on the front plate 1a. An indium tin oxide film is deposited about 2000 Å on the front plate 1a by sputtering and the like and the resultant structure is patterned by a photolithography process. Thereafter indium tin oxide 2a is formed (FIG. 4A).

Figure 4B:
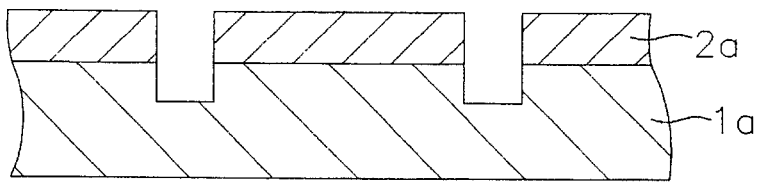

A second step is forming a trench having a predetermined depth by etching the front plate 1a by using the group of electrodes 2a formed by the above-mentioned step as masks. It is desirable to be 6000 to 10000 Å for the depth in etching the front plate 1a. The full explanation will be followed (FIG. 4B).

Figure 4C:
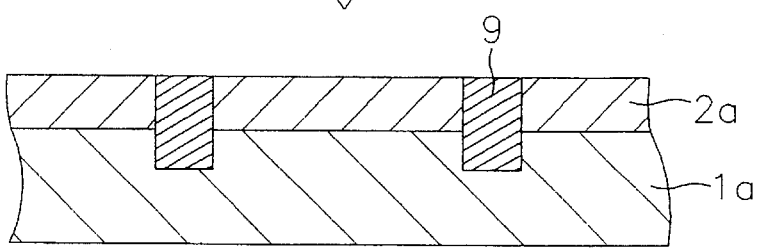

A third step is forming the smoothing films 9 having about the same heights as those of the group of electrodes 2a inside the trench formed by the above-mentioned step. Carbon black solution is coated in the depth of about 8000 to 12000 Å by a spinner used for coating an alignment material, thereby the smoothing films 9 are formed (FIG. 4C).

At this time, since a dispersion diameter of the carbon black solution is large, it is difficult to form a thin film. On the other hand, the carbon black solution serves as a material for a smoothing film according to the preferred embodiment of the present invention because it is an economical and good material for stabilizing the process.

According to a preferred embodiment of the present invention, since the height difference can be removed when the ITO film is deposited in the depth of about 2000 Å, the desirable depth of trench is set in 6000 to 10000 Å, considering the coating limit of the carbon black solution in order to overcome the limitations of above-mentioned carbon black solution.

Figure 4D:
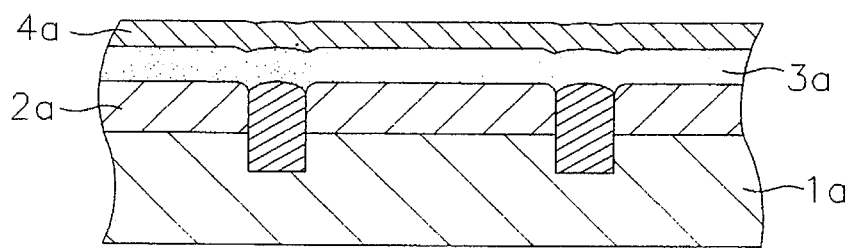

A fourth step is coating an insulating layer 3a and an alignment film 4a on the group of electrodes 2a and the smoothing films 9 keeping a uniform evenness throughout the above-mentioned steps (FIG. 4D).

Referring to FIG. 3, the liquid crystal display forming the smoothing films 9 on the front plate 1a can keep a uniform distance between both the alignment films 4a and 4b because the surfaces of them are smoothed so as to improve display characteristic. Moreover, since the liquid crystal display uses a principle of birefringence, display color changes according to the distance between both the alignment films. However, the liquid crystal display having the uniform distance between both the alignment films according to the preferred embodiment of the present invention leads to improvement in the display and keeps the color uniform.

As mentioned above, according to the preferred embodiment of the present invention, the liquid crystal display with high resolution and high quality smooths the surface of the alignment film by removing the height difference between the group of transparent electrodes formed inside the front plate whereon a plurality of layers are deposited. In addition, commercial value of the product can be improved by smoothing the indium tin oxide electrodes and the alignment films in compliance with the demand of users for the high quality.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method for forming a liquid crystal display including a front plate and a rear plate stuck to each other by a sealing material spread along the edges to form a predetermined closed space where liquid crystal is injected, comprising the steps of:

forming a group of electrodes having a predetermined pattern inside a front plate;

forming a trench having a predetermined depth by etching the front plate by using the pattern of the electrodes as a mask;

filling the said trench with a smoothing film having about the same height as that of the patterns of the electrodes in the upper portion of the trench front plate; and forming an insulating layer and an alignment film respectively on the upper portion of the smoothing film and the pattern of the electrodes.

2. The method of claim 1 wherein said smoothing film is made of carbon black solution for stabilizing the process.

3. The method of claim 1 wherein a depth of said trench is 6000 to 10000 Å.

4. A liquid crystal display with a smoothing film, comprising:

a group of electrodes having a predetermined pattern, insulating layers and alignment films which are orderly deposited inside a front plate and a rear plate opposing each other;

a trench having a predetermined depth formed on the front plate; and a smoothing film having the same height as that of said pattern deposited on an upper portion of the trenched front plate in accordance with the said pattern trenched in accordance with said pattern.

5. The liquid crystal display with a smoothing film according to claim 4 wherein the carbon black solution is used as a material for said smoothing film.

* * * * *

UNITED STATES PATENT AND TRADEMARK OFFICE
CERTIFICATE OF CORRECTION

PATENT NO. : 5,499,125
DATED : March 12, 1996
INVENTOR(S) : Hyeon-tae Kim; Jin-kyu Kang It is certified that error appears in the above-indentified patent and that said Letters Patent is hereby corrected as shown below:

```
On the Title page, Item [54], in the title replace
          "TREACHED" with -- TRENCHED --.
Column 1, line 2, in the title replace "TREACHED" with
          -- TRENCHED --.
Column 1, line 66, change "since" to -- Since --.
Column 3, line 29, delete "be followed" and insert therefor
          -- follow --.
Column 3, line 49, before "above-mentioned" insert
          -- the --.
Column 4, line 36, change "trench" to -- trenched --.
Column 4, lines 55-56, after "pattern" delete "trenched in
          accordance with said pattern".
```

Signed and Sealed this

Twelfth Day of November, 1996

Attest:

BRUCE LEHMAN

*Attesting Officer*   *Commissioner of Patents and Trademarks*